(12) United States Patent
Suciu et al.

(10) Patent No.: US 10,711,631 B2
(45) Date of Patent: Jul. 14, 2020

(54) TURBINE ENGINE WITH GUIDE VANES FORWARD OF ITS FAN BLADES

(71) Applicant: United Technologies Corporation, Hartford, CT (US)

(72) Inventors: Gabriel L. Suciu, Glastonbury, CT (US); Wesley K. Lord, South Glastonbury, CT (US); Jayant Sabnis, Glastonbury, CT (US); Jesse M. Chandler, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 559 days.

(21) Appl. No.: 14/976,876

(22) Filed: Dec. 21, 2015

(65) Prior Publication Data

US 2016/0186599 A1      Jun. 30, 2016

Related U.S. Application Data

(60) Provisional application No. 62/096,662, filed on Dec. 24, 2014.

(51) Int. Cl.
| | |
|---|---|
| *F01D 1/02* | (2006.01) |
| *F01D 17/10* | (2006.01) |
| *F01D 7/00* | (2006.01) |
| *F01D 5/02* | (2006.01) |
| *F01D 9/04* | (2006.01) |
| *F01D 25/24* | (2006.01) |
| *F02C 3/107* | (2006.01) |
| *F02C 3/14* | (2006.01) |

(52) U.S. Cl.
CPC ............. *F01D 17/105* (2013.01); *F01D 1/02* (2013.01); *F01D 1/023* (2013.01); *F01D 5/02* (2013.01); *F01D 7/00* (2013.01); *F01D 9/041* (2013.01); *F01D 25/24* (2013.01); *F02C 3/107* (2013.01); *F02C 3/14* (2013.01); *F05D 2220/323* (2013.01); *F05D 2240/128* (2013.01); *F05D 2240/24* (2013.01); *F05D 2240/60* (2013.01); *F05D 2260/606* (2013.01)

(58) Field of Classification Search
CPC ... F02K 3/04; F02K 3/062; F01D 1/02; F01D 25/28; F05D 2220/323
See application file for complete search history.

(56) References Cited

U.S. PATENT DOCUMENTS

| | | | |
|---|---|---|---|
| 3,262,635 A | | 7/1966 | Smuland et al. |
| 3,312,448 A | * | 4/1967 | Huil, Jr. ................. F01D 9/065 184/6 |
| 3,729,957 A | * | 5/1973 | Petrie |
| 4,055,949 A | * | 11/1977 | Boudigues |

(Continued)

FOREIGN PATENT DOCUMENTS

| | | |
|---|---|---|
| GB | 1212593 A | 11/1970 |
| GB | 1290485 A | 9/1972 |

OTHER PUBLICATIONS

EP search report for EP15202683.7 dated May 25, 2016.

*Primary Examiner* — Arun Goyal
(74) *Attorney, Agent, or Firm* — Getz Balich LLC (57) ABSTRACT

A turbine engine such as a pusher fan engine is provided. This turbine engine includes a nacelle with a bypass flowpath. A fan rotor is configured to propel air out of the bypass flowpath. A plurality of guide vanes are configured to direct the air to the fan rotor.

14 Claims, 5 Drawing Sheets

(56) References Cited

U.S. PATENT DOCUMENTS

| | | | |
|---|---|---|---|
| 5,197,855 A | | 3/1993 | Magliozzi et al. |
| 5,199,850 A | | 4/1993 | Carvalho et al. |
| 5,383,332 A | * | 1/1995 | Angel ................. F02K 1/004 60/225 |
| 7,631,484 B2 | * | 12/2009 | Giffin ................. F02C 3/073 60/226.1 |
| 7,891,163 B2 | | 2/2011 | Richards |
| 8,210,798 B2 | | 7/2012 | Stern |
| 8,371,105 B2 | | 2/2013 | Glynn et al. |
| 8,425,191 B2 | | 4/2013 | Ali |
| 8,444,085 B2 | | 5/2013 | Stretton et al. |
| 8,516,789 B2 | * | 8/2013 | Kupratis ............. F02K 3/065 60/226.1 |
| 8,672,260 B2 | | 3/2014 | Penda et al. |
| 8,701,385 B2 | * | 4/2014 | Clemen |
| 8,708,274 B2 | | 4/2014 | Lord |
| 8,764,381 B2 | | 7/2014 | Stern |
| 8,876,462 B2 | | 11/2014 | Balk et al. |
| 8,876,465 B2 | | 11/2014 | Stretton |
| 9,016,041 B2 | * | 4/2015 | Baughman ........... F02K 3/065 60/226.1 |
| 9,884,687 B2 | * | 2/2018 | Marrinan |
| 2010/0047068 A1 | | 2/2010 | Parry et al. |
| 2011/0120083 A1 | * | 5/2011 | Giffin ................. F01D 5/022 60/226.3 |
| 2016/0160647 A1 | * | 6/2016 | Hofer ................. F01D 1/04 415/68 |

* cited by examiner

TURBINE ENGINE WITH GUIDE VANES FORWARD OF ITS FAN BLADES

This application claims priority to U.S. Patent Appln. No. 62/096,662 filed Dec. 24, 2014, which is hereby incorporated by reference.

BACKGROUND OF THE INVENTION

1. Technical Field

This disclosure relates generally to a turbine engine and, more particularly, to a turbine engine with a bypass fan.

2. Background Information

Various types of turbine engines for propelling an aircraft are known in the art. An example of one such turbine engine is a turbofan engine which includes a fan forward of its core. Another example of a turbine engine is a pusher fan engine which includes a fan aft of its core. Still another example of a turbine engine is a propfan engine which includes an uncovered or unshrouded propeller (instead of a fan) aft of its core. While each of the foregoing turbine engine types have various advantages, there is still a need in the art for improved turbine engine efficiency as well as reduced turbine engine weight and costs.

SUMMARY OF THE DISCLOSURE

According to an aspect of the invention, a pusher fan engine is provided that includes structure nacelle having a bypass inlet and a nozzle, with a bypass flowpath extending from the inlet to the nozzle. The pusher fan engine also includes a pusher fan rotor and a plurality of guide vanes. The pusher fan rotor includes a plurality of fan blades within the bypass flowpath. The guide vanes are within the bypass flowpath and between the inlet and the fan blades.

According to another aspect of the invention, a turbine engine is provided that includes a nacelle with a bypass flowpath. The turbine engine also includes a pusher fan rotor and a plurality of guide vanes. The pusher fan rotor includes a plurality of fan blades within the bypass flowpath, and is configured to propel air out of the bypass flowpath. The guide vanes are configured to direct the air to the fan rotor.

The fan rotor may be configured to swirl the air in a first direction. The guide vanes may be configured to swirl the air in a second direction opposite the first direction.

The guide vanes may be pitched in an opposite direction from the fan blades. The guide vanes, for example, may be pitched in a substantially equal but opposite direction from the fan blades.

At least one of the guide vanes may be a structural guide vane.

The bypass flowpath may extend from an inlet to a nozzle. The guide vanes may be within the bypass flowpath and between the inlet and the fan blades.

A turbine rotor and a gear train may be included. The gear train may connect the turbine rotor with the fan rotor. This turbine rotor may be a free turbine rotor.

A turbine engine core may be included and axially forward of the fan rotor. This turbine engine core may be configured as or otherwise include a multi-spool turbine engine core.

At least one of the fan blades may be configured as a variable pitch fan blade.

The nacelle may include an inner casing and an outer casing. The inner and the outer casings may be structurally tied together through a mount system which includes at least one of the guide vanes.

The nacelle may include an inner casing and an outer casing, wherein the outer casing is structurally tied to the inner casing through at least one of the guide vanes.

A bifurcation may extend radially through the bypass flowpath and between the inlet and the fan rotor. This bifurcation may be configured as a substantially non-structural component of the pusher fan engine.

The foregoing features and the operation of the invention will become more apparent in light of the following description and the accompanying drawings.

DETAILED DESCRIPTION OF THE INVENTION

Figure 1:
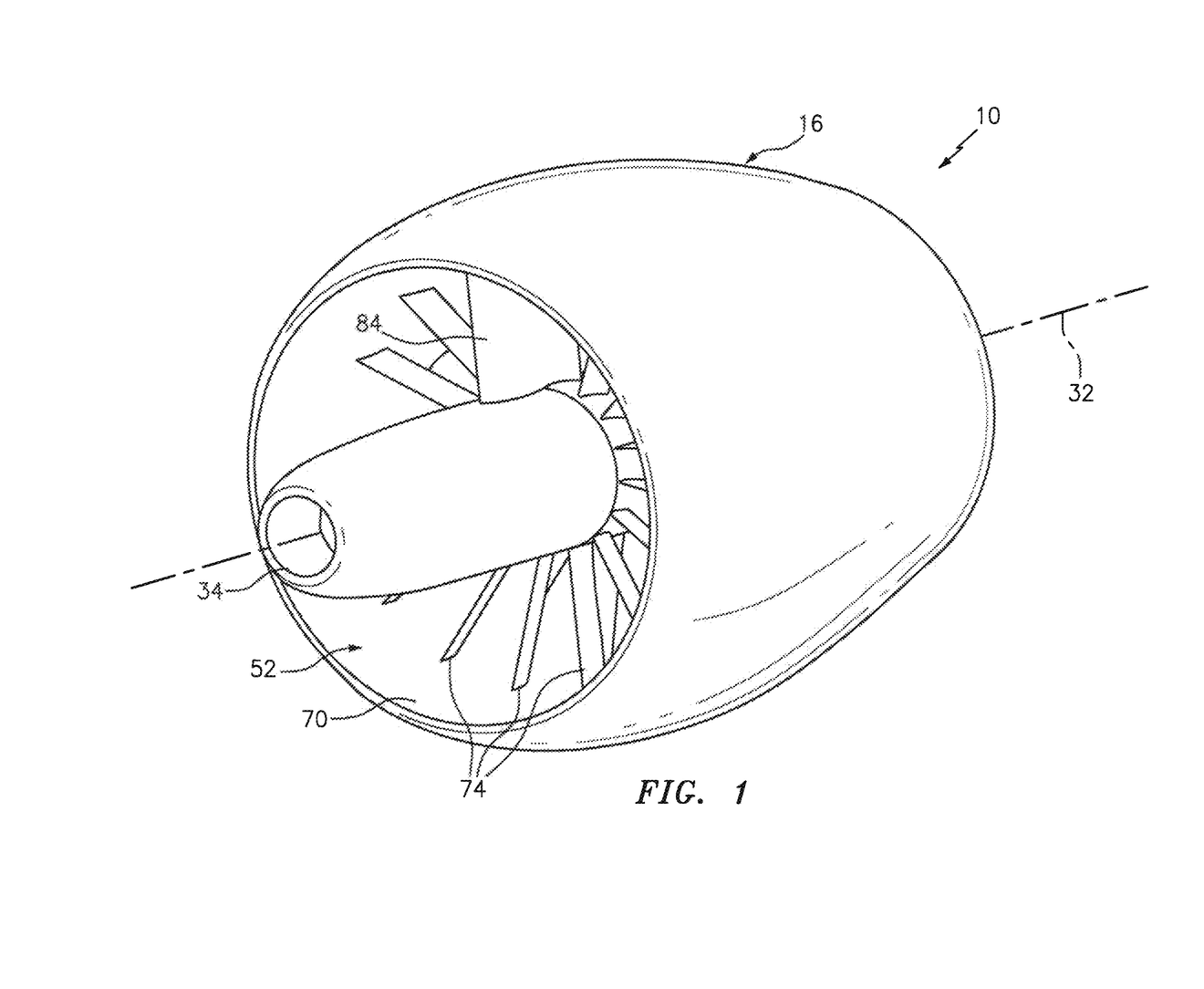
FIG. 1 is a perspective illustration of an embodiment of a turbine engine.
Figure 2:
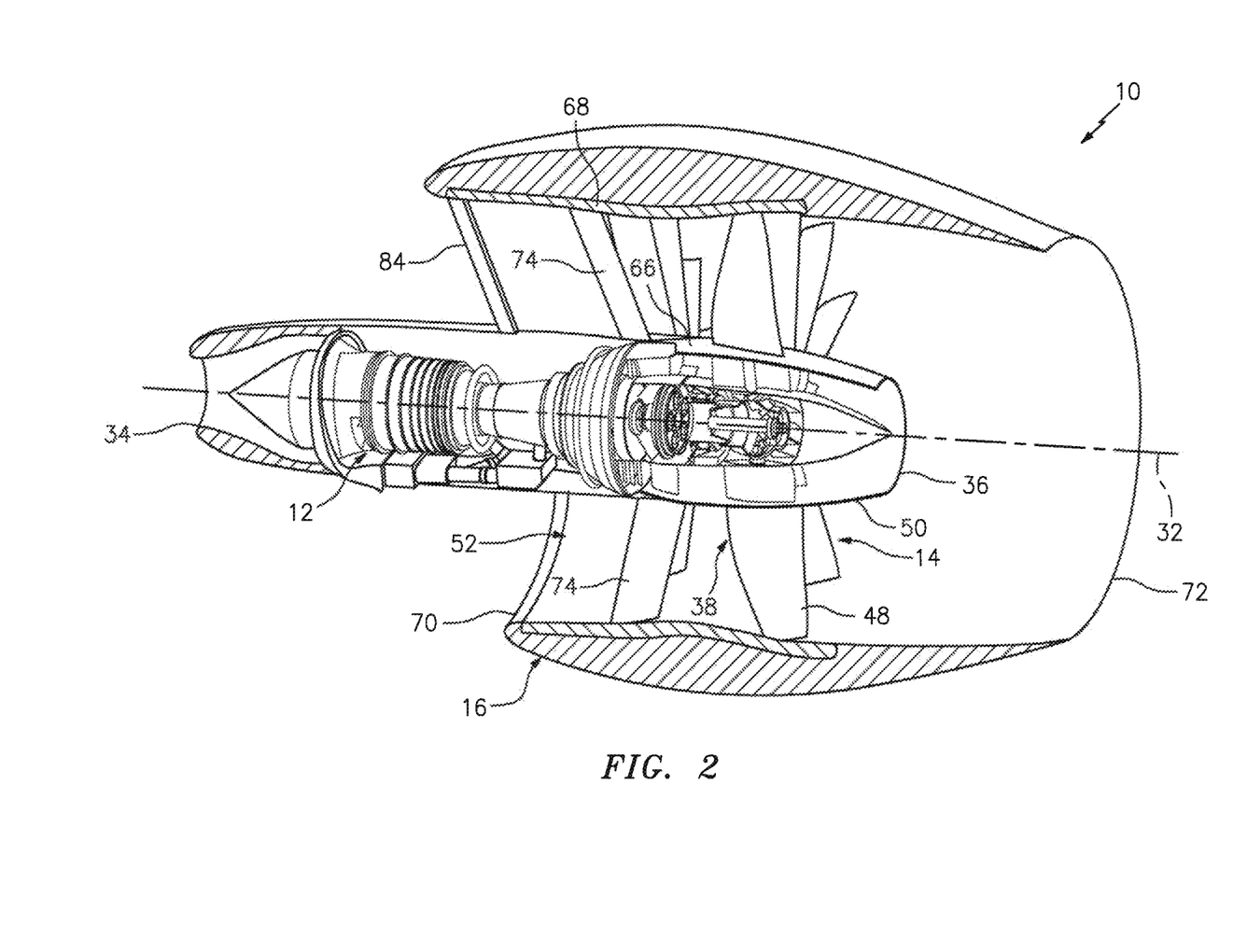
FIG. 2 is a perspective cutaway illustration of the turbine engine of FIG. 1.

FIGS. 1 and 2 illustrate a turbine engine 10 configured as a geared pusher fan engine. This turbine engine 10 may be mounted at (e.g., on, adjacent or proximate) an aft end of an aircraft. Alternatively, the turbine engine 10 may be mounted elsewhere on the aircraft, e.g., below-wing.

The turbine engine 10 includes a turbine engine core 12 and a pusher fan system 14. The turbine engine 10 also includes a turbine engine structure in the form of a nacelle 16 which houses the turbine engine core 12 and the pusher fan system 14.

The turbine engine core 12 may be configured as a multi-spool turbine engine core. The turbine engine core 12 of FIG. 3, for example, includes a low speed spool, a high speed spool and a combustor 18. The low speed spool includes a low speed shaft 20 which connects a low pressure compressor (LPC) rotor 22 to a low pressure turbine (LPT) rotor 24. The high speed spool includes a high speed shaft 26 which connects a high pressure compressor (HPC) rotor 28 to a high pressure turbine (HPT) rotor 30. The rotors 22, 28, 30 and 24 are arranged sequentially along an axial centerline 32 of the turbine engine 10 between a forward core airflow inlet 34 and an aft core airflow exhaust nozzle 36. The combustor 18 is arranged axially between the high pressure compressor rotor 28 and the high pressure turbine rotor 30.

Figure 3:
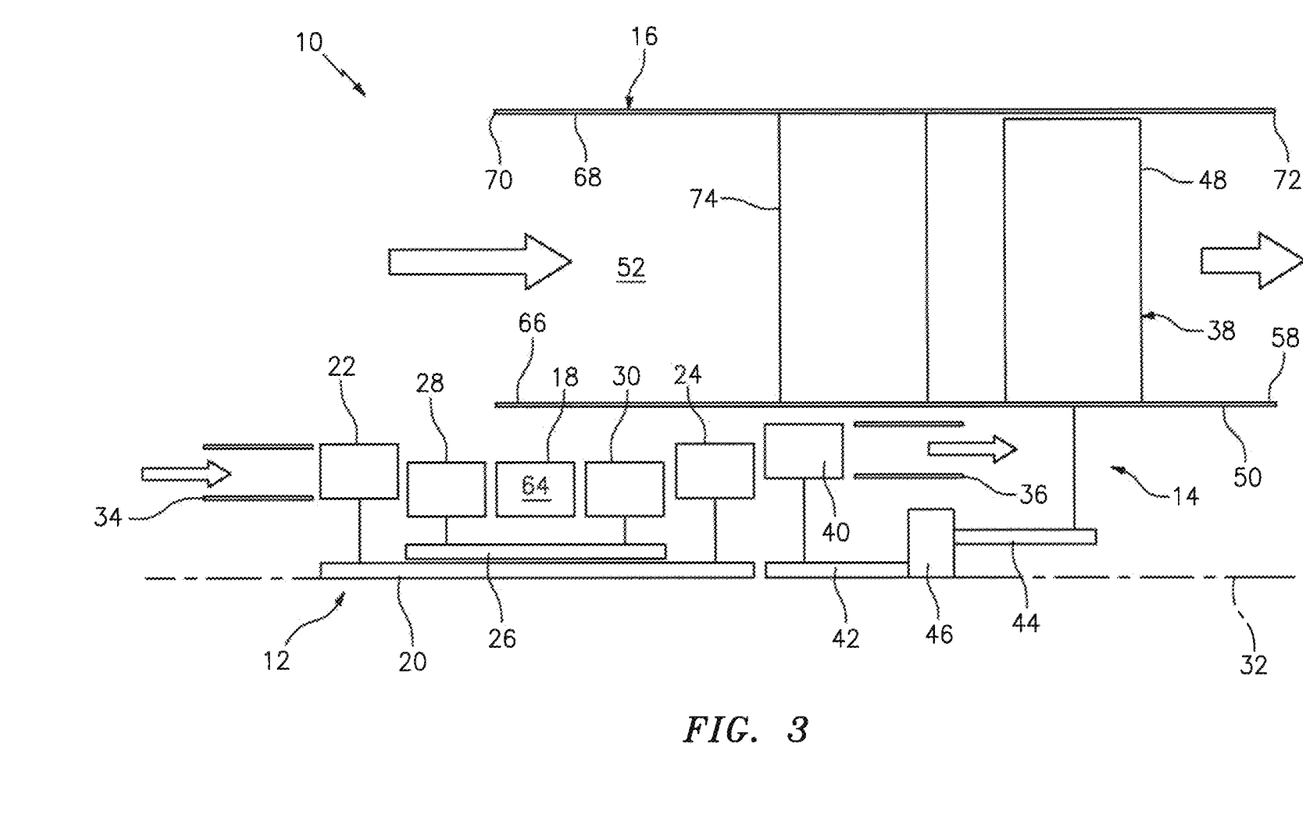
FIG. 3 is a partial schematic illustration of the turbine engine of FIG. 1.

The pusher fan system 14 is arranged downstream and aft of the turbine engine core 12. The pusher fan system 14 includes a fan rotor 38 connected to a turbine rotor 40. This turbine rotor 40 may be configured as a low pressure free turbine rotor and arranged next to and downstream of the low pressure turbine rotor 24 and, thus, aft of the turbine engine core 12. The turbine rotor 40 may be connected to the fan rotor 38 through one or more shafts 42 and 44 and/or a gear train 46. The gear train 46 may be an epicyclic transmission such as a planetary gear system or a star gear system. The gear train 46 may be configured as a reduction transmission such that the turbine rotor 40 rotates at a faster speed than the fan rotor 38.

Figure 4:
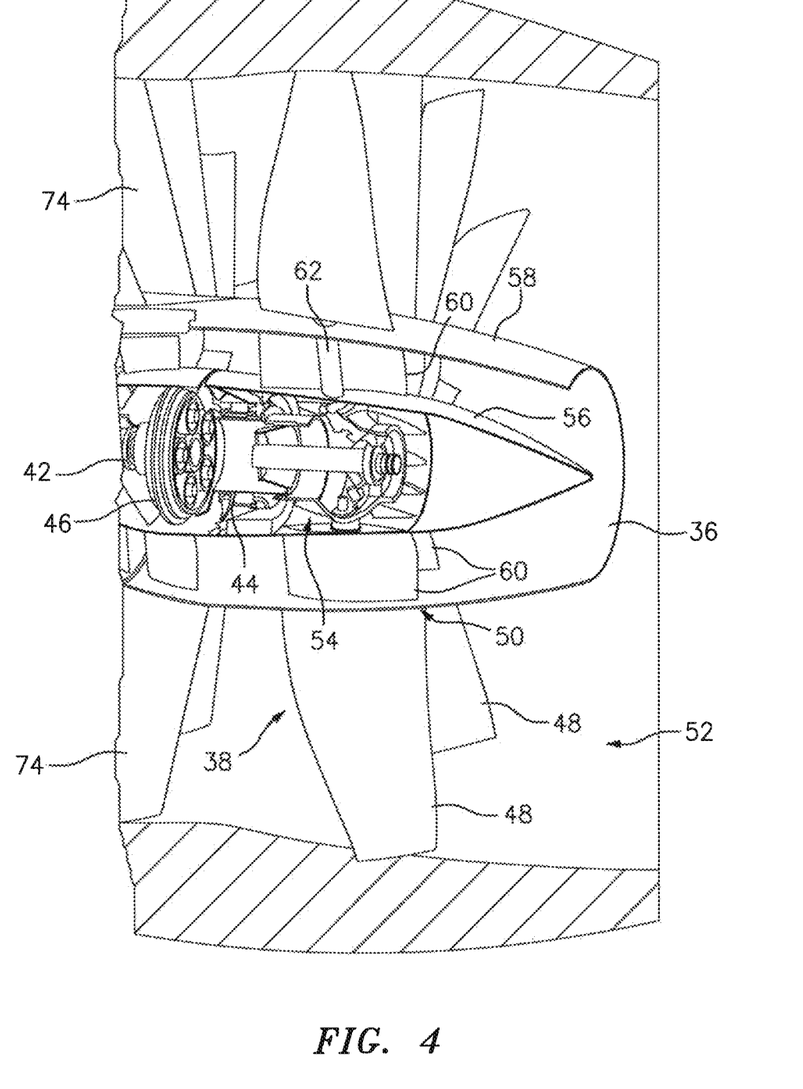
FIG. 4 is an enlarged illustration of a portion of the turbine engine illustrated in FIG. 2.

The fan rotor 38 is arranged aft of the turbine rotor 40 and the turbine engine core 12. The fan rotor 38 includes a plurality of fan blades 48. These fan blades 48 are arranged around a fan rotor hub 50 and within an annular bypass flowpath 52. Referring to FIG. 4, each of the fan blades 48 may be pivotally connected to the fan rotor hub 50. With this configuration, a pitch of each fan blade 48 may be changed using an actuation system 54 within the fan rotor hub 50. The actuation system 54 may be configured for limited variable pitch. Alternatively, the actuation system 54 may be configured for full variable pitch where, for example, the fan blade pitch may be completely reversed. Various actuations systems for pivoting fan blades 48 are known in the art and the present disclosure is not limited to any particular types or configurations thereof. Of course, in other embodiments, one or more of the fan blades 48 may be fixedly connected to the fan rotor hub 50.

The fan rotor hub 50 of FIG. 4 includes an inner platform 56 and an outer platform 58. The fan rotor hub 50 also includes a plurality of rotor vanes 60. Each of these rotor vanes 60 extends radially between and is connected to the inner platform 56 and the outer platform 58. One or more of the rotor vanes 60 may be hollow such that an actuation shaft 62 may extend radially therethrough from the actuation system 54 to a respective one of the fan blades 48. In this manner, the actuation system 54 may pivot the fan blades 48 by twisting the actuation shafts 62 in order to change the fan blade pitch.

During operation, referring to FIG. 3, air enters the turbine engine core 12 through the core airflow inlet 34. This air, which may be referred to as "core air", is compressed by the compressor rotors 22 and 28 and directed into a combustion chamber 64 in the combustor 18. Fuel is injected into the combustion chamber 64 and mixed with the compressed air to provide a fuel-air mixture. This fuel air mixture is ignited and combustion products thereof flow through and sequentially cause the turbine rotors 30, 24 and 40 to rotate. The rotation of the turbine rotors 30 and 24 respectively drive rotation of the compressor rotors 28 and 22 and, thus, compression of the air received from the core airflow inlet 34. The rotation of the turbine rotor 40 drives rotation of the fan rotor 38, which propels bypass air through and out of the bypass flowpath 52. The propulsion of the bypass air may account for a majority of thrust generated by the turbine engine 10, e.g., more than seventy-five percent (75%) of turbine engine thrust. The turbine engine 10 of the present disclosure, however, is not limited to the foregoing exemplary thrust ratio.

Referring to FIGS. 2 and 3, the nacelle 16 forms the bypass flowpath 52 and includes an inner casing 66 and an outer casing 68. The bypass flowpath 52 is located radially between the inner casing 66 and the outer casing 68. The bypass flowpath 52 extends axially along the centerline 32, for example through the nacelle 16, from a forward bypass airflow inlet 70 to an aft bypass airflow exhaust nozzle 72.

The inner casing 66 may be configured with or as part of an inner cowling, e.g., a core cowling or nacelle. The inner casing 66 houses one or more components of the turbine engine core 12. The inner casing 66 may also house one or more components of the pusher fan system 14 such as, for example, the turbine rotor 40 and/or the gear train 46 (see FIG. 2). The inner casing 66 may be configured as a single unitary case. Alternatively, the inner casing 66 may include a plurality of cases which are attached to one another.

The outer casing 68 houses at least the fan rotor 38. A forward portion of the outer casing 68 also axially overlaps an aft portion of the inner casing 66. The outer casing 68 may be configured as a single unitary case. Alternatively, the outer casing 68 may include a plurality of cases which are attached to one another.

The inner casing 66 is connected to the outer casing 68 through a plurality of guide vanes 74. One or more of these guide vanes 74 may each be configured as a structural guide vane. Each of the guide vanes 74, for example, may structurally tie the inner casing 66 and the outer casing 68 together, i.e., be configured to transfer radial, axial and/or tangential loads between the casings 66 and 68.

The guide vanes 74 are arranged circumferentially around the centerline 32 and may be axially aligned in a single array. Each of the guide vanes 74 extends radially between and is attached to the inner casing 66 and the outer casing 68. Each of the guide vanes 74, for example, may be mechanically fastened, welded, brazed and/or adhered to the inner casing 66 and/or the outer casing 68. With such a configuration, the guide vanes 74 provide a single plane mount system between the inner casing 66 and the outer casing 68. The turbine engine 10 of the present disclosure, however, is not limited to the foregoing exemplary mount system nor single plane mount systems in general.

Figure 5:
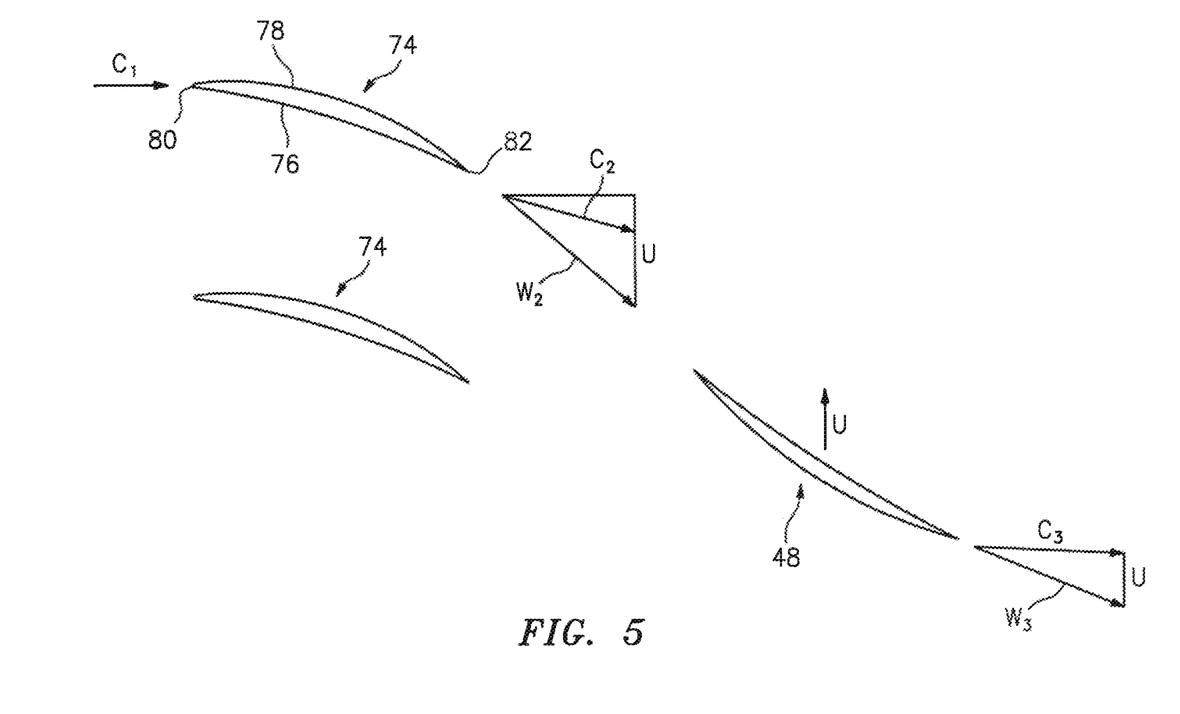
FIG. 5 is a schematic illustration of an embodiment of a guide vane and an embodiment of a fan blade.

Referring to FIG. 5, each of the guide vanes 74 is configured as an airfoil. In particular, each of the guide vanes 74 has opposing sides 76 and 78 that extend longitudinally between a leading edge 80 and a trailing edge 82. The side 76 is generally concave. The side 78 is generally convex. Of course, the present disclosure is not limited to any particular guide vane 74 shapes or configurations.

Referring to FIGS. 2 and 3, the guide vanes 74 are also arranged to direct air (e.g., bypass air) received from the bypass inlet 70 to the fan blades 48. Each of the guide vanes 74, for example, is disposed within the bypass flowpath 52 axially between the inlet bypass 70 and the fan blades 48. Referring again to FIG. 5, each of the guide vanes 74 has a pitch that facilitates swirling the air in a first (e.g., clockwise) direction and turning the air into the fan blades 48. Each of the fan blades 48, in contrast, may have a pitch that facilitates swirling the air in a second (e.g., counter-clockwise) direction during at least, for example, one (e.g., forward cruise) mode of operation. The pitch of the fan blades 48 may be substantially equal to, but opposite, the pitch of the guide vanes 74 during that mode of operation. In this manner, the swirl imparted to the air by the fan blades 48 may substantially (e.g., completely or almost completely) counteract the swirl imparted to the air by the guide vanes 74 such that the air being propelled by the fan blades 48 out of the bypass flowpath 52 travels along a substantially axial trajectory. Exhausting the bypass air from the nozzle 72 (see FIGS. 2 and 3) along such a substantially axial trajectory may increase turbine engine thrust and/or efficiency.

More particularly, referring to FIG. 5, the bypass air may enter the bypass inlet 70 in a generally axial direction. The velocity into the guide vanes 74 is shown as $C_1$. The guide vanes 74 are chambered and impart swirl in a first direction. The velocity exiting the guide vanes 74 in the stationary frame of reference is shown as $C_2$. The fan blades 48 have tangential velocity U in the opposite direction of the guide vane swirl. The relative velocity into the fan blades is $W_2$, the vector sum of vane exit velocity $C_2$ and wheel velocity U. The fan blades 48 are cambered in the opposite sense of the guide vanes 74, such that swirl velocity may be reduced across the blades 48. The relative velocity at blade exit is shown as $W_3$, and the blade exit velocity in the stationary frame, $C_3$, may be substantially axial.

Each of the guide vanes 74 may be configured as a unitary hollow or solid body, e.g., a monolithic guide vane. Alternatively, one or more of the guide vanes 74 may each include a structural strut that extends radially through a hollow (e.g., substantially non-structural) airfoil.

Referring to FIGS. 1 and 2, to facilitate the routing of utility, sensor and/or control lines to the turbine engine core 12, a bifurcation 84 such as a pylon may be disposed within and extend radially through the bypass flowpath 52. This bifurcation 84 may be arranged axially between the bypass inlet 70 and the fan rotor 38 and, for example, forward of, or axially aligned with, the guide vanes 74. The bifurcation 84 may be configured as a non-structural component such that substantially no loads are transferred therethrough between the inner casing 66 and the outer casing 68. Alternatively, the bifurcation 84 may also or alternatively structurally tie the inner casing 66 to the outer casing 68. Where the bifurcation 84 is a structural component, one or more of the guide vanes 74 may be configured as a non-structural component.

The turbine engine 10 may have various configurations other than that described above and illustrated in the drawings. The turbine engine 10, for example, may be configured with a single spool turbine engine core. The fan rotor 38 may be connected to the turbine rotor 40 without the gear train 46. Alternatively, the fan rotor 38 may be directly connected to a spool of the turbine engine core 12 (e.g., the low speed spool) with or without use of the gear train 46. The present invention, therefore, is not limited to any particular turbine engine configurations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A pusher fan engine with a centerline, comprising:
   a nacelle having a forward bypass inlet and an aft nozzle, with a bypass flowpath extending axially aft along the centerline from the forward bypass inlet to the aft nozzle;
   a pusher fan rotor including a plurality of fan blades within the bypass flowpath;
   a plurality of guide vanes within the bypass flowpath and axially between the forward bypass inlet and the fan blades along the centerline;
   a turbine engine core including a compressor rotor, a combustor and a turbine rotor, the turbine rotor coupled to the compressor rotor and arranged axially forward of the pusher fan rotor along the centerline;
   a free turbine rotor connected to the pusher fan rotor; and
   a gear train connecting the free turbine rotor with the pusher fan rotor;
   wherein a portion of the bypass flowpath, within which the fan blades are arranged, is configured fluidly in parallel with a core flowpath with which the compressor rotor, the turbine rotor and the free turbine rotor are arranged;
   wherein the plurality of guide vanes are pitched in a substantially equal but opposite direction from the plurality of fan blades; and
   wherein the plurality of guide vanes structurally tie the nacelle and the turbine engine core together to transfer radial, axial and/or tangential loads between the nacelle and the turbine engine core.

2. The pusher fan engine of claim 1, wherein at least one of the plurality of fan blades is configured as a variable pitch fan blade.

3. The pusher fan engine of claim 1, wherein the nacelle includes an inner casing and an outer casing, and the inner casing and the outer casing are structurally tied together through a mount system which includes at least one of the plurality of guide vanes.

4. The pusher fan engine of claim 1, wherein the nacelle includes an inner casing and an outer casing, and wherein the outer casing is structurally tied to the inner casing through at least one of the plurality of guide vanes.

5. The pusher fan engine of claim 1, further comprising a bifurcation extending through the bypass flowpath and between the bypass inlet and the pusher fan rotor.

6. The pusher fan engine of claim 5, wherein the bifurcation is configured as a substantially non-structural component of the pusher fan engine.

7. The pusher fan engine of claim 1, wherein the turbine engine core comprises a multi-spool turbine engine core.

8. The pusher fan engine of claim 1, wherein an outlet of the core flowpath is located at an axial location along the centerline that is aft and downstream of the plurality of fan blades.

9. The pusher fan engine of claim 1, wherein
   the pusher fan rotor further includes a platform that extends axially aft along the centerline and downstream of the plurality of fan blades; and
   the core flowpath is radially separated from the bypass flowpath by the platform.

10. A turbine engine comprising:
    a nacelle with a bypass flowpath;
    a pusher fan rotor rotatable about an axial centerline of the turbine engine, the pusher fan rotor including a plurality of fan blades within the bypass flowpath, and the pusher fan rotor configured to propel air axially aft out of the bypass flowpath along the axial centerline; and
    a plurality of guide vanes within the bypass flowpath and configured to direct the air to the pusher fan rotor;
    a turbine engine core including a compressor rotor, a combustor and a turbine rotor, the combustor arranged axially forward of the pusher fan rotor along the axial centerline; and
    a free turbine rotor aft of the turbine engine core and connected to the pusher fan rotor through a shaft;
    wherein a portion of the bypass flowpath, within which the plurality of fan blades are arranged, is configured fluidly in parallel with a core flowpath into which the compressor rotor, the turbine rotor and the free turbine rotor extend;
    wherein the plurality of guide vanes are pitched in a substantially equal but opposite direction from the fan blades; and
    wherein the plurality of guide vanes structurally tie the nacelle and the turbine engine core together to transfer radial, axial and/or tangential loads between the nacelle and the turbine engine core.

11. The turbine engine of claim 10, wherein the pusher fan rotor is configured to swirl the air in a first direction, and the plurality of guide vanes are configured to swirl the air in a second direction opposite the first direction.

12. The turbine engine of claim 10, wherein
    the bypass flowpath extends from an inlet to a nozzle; and the plurality of guide vanes are between the inlet and the plurality of fan blades.

13. The turbine engine of claim 10, further comprising a gear train connecting the free turbine rotor with the pusher fan rotor.

14. The turbine engine of claim 10, wherein an exhaust nozzle of the core flowpath is fluidly coupled with the bypass flowpath at an axial location along the axial centerline that is aft and downstream of the pusher fan rotor and the plurality of fan blades.

* * * * *